(12) United States Patent
Miyato et al.

(10) Patent No.: US 10,942,352 B2
(45) Date of Patent: Mar. 9, 2021

(54) HEAD-UP DISPLAY APPARATUS

(71) Applicant: DENSO CORPORATION, Kariya (JP)

(72) Inventors: Taizo Miyato, Kariya (JP); Kazuyuki Ishihara, Kariya (JP); Kazuhisa Onda, Kariya (JP)

(73) Assignee: DENSO CORPORATION, Kariya (JP)

( * ) Notice: Subject to any disclaimer, the term of this patent is extended or adjusted under 35 U.S.C. 154(b) by 227 days.

(21) Appl. No.: 16/070,530

(22) PCT Filed: Oct. 21, 2016

(86) PCT No.: PCT/JP2016/081198
§ 371 (c)(1),
(2) Date: Jul. 17, 2018

(87) PCT Pub. No.: WO2017/126176
PCT Pub. Date: Jul. 27, 2017

(65) Prior Publication Data
US 2019/0033586 A1     Jan. 31, 2019

(30) Foreign Application Priority Data

Jan. 19, 2016    (JP) .............................. JP2016-008265

(51) Int. Cl.
*G02B 27/01*     (2006.01)
*G02B 26/10*     (2006.01)
(Continued)

(52) U.S. Cl.
CPC .......... *G02B 27/0101* (2013.01); *B60K 35/00* (2013.01); *B60R 11/00* (2013.01);
(Continued)

(58) Field of Classification Search
CPC .. G02B 27/0101; G02B 26/101; G02B 17/08; G02B 26/10; G02B 2027/0116;
(Continued)

(56) References Cited

U.S. PATENT DOCUMENTS

2005/0237615 A1   10/2005   Urey et al.
2005/0248849 A1*   11/2005   Urey .................... G02B 27/017
                                                                          359/619

(Continued)

FOREIGN PATENT DOCUMENTS

JP          2007094394 A   *   4/2007
JP          2007523369 A      8/2007
(Continued)

*Primary Examiner* — William R Alexander
*Assistant Examiner* — Alberto J Betancourt
(74) *Attorney, Agent, or Firm* — Harness, Dickey & Pierce, P.L.C.

(57) ABSTRACT

A laser projection portion projects multiple laser light fluxes having different wavelengths and superimposed one on another. A scan portion scans the laser light fluxes from the laser projection portion. The image is drawn on a screen member upon incidence of the laser light fluxes scanned by the scan portion. A refraction element portion having positive refractive power is located on a light path between the scan portion and the screen member and adjusts an incident angle of the laser light fluxes to the screen member by refraction. The refraction element portion includes a positive lens part and a negative lens part. The positive lens part has positive refractive power. The negative lens part is made of a medium with a higher dispersing quality than a medium forming the positive lens part and has negative refractive power.

7 Claims, 5 Drawing Sheets

(51) Int. Cl.
  *G02B 17/08* (2006.01)
  *B60K 35/00* (2006.01)
  *B60R 11/00* (2006.01)

(52) U.S. Cl.
  CPC ............ *G02B 17/08* (2013.01); *G02B 26/10* (2013.01); *G02B 26/101* (2013.01); *B60K 2370/1529* (2019.05); *B60K 2370/23* (2019.05); *B60K 2370/333* (2019.05); *B60K 2370/334* (2019.05); *B60R 2300/205* (2013.01)

(58) Field of Classification Search
  CPC .. G02B 27/01; G02B 27/0149; G02B 27/017; G02B 27/0172; G02B 27/0176; G02B 27/0179; B60R 11/00; B60R 2300/205; B60K 35/00; B60K 2370/1529; B60K 2370/23; B60K 2370/333; B60K 2370/334; H04N 13/044; H04N 5/7491
  USPC ...... 359/13–14, 629–633; 345/7–9; 348/115; 349/11
  See application file for complete search history.

(56) References Cited

U.S. PATENT DOCUMENTS

| | | |
|---|---|---|
| 2007/0103747 A1 | 5/2007 | Powell et al. |
| 2008/0212194 A1 | 9/2008 | Powell et al. |
| 2008/0218822 A1 | 9/2008 | Powell et al. |
| 2013/0021224 A1* | 1/2013 | Fujikawa ............ G02B 27/0101 345/7 |
| 2013/0063754 A1* | 3/2013 | Saisho ............... G02B 27/0101 358/1.13 |
| 2014/0043689 A1* | 2/2014 | Mason ............... G02B 27/0101 359/630 |
| 2015/0219895 A1* | 8/2015 | Laycock ............ G02B 27/0025 359/630 |

FOREIGN PATENT DOCUMENTS

| | | |
|---|---|---|
| JP | 2010145924 A | 7/2010 |
| JP | 2013025205 A | 2/2013 |
| JP | 2014235268 A | 12/2014 |

* cited by examiner

HEAD-UP DISPLAY APPARATUS

CROSS REFERENCE TO RELATED APPLICATIONS

This application is a U.S. National Phase Application under 35 U.S.C. 371 of International Application No. PCT/JP2016/081198 filed on Oct. 21, 2016 and published in Japanese as WO 2017/126176 A1 on Jul. 27, 2017. This application is based on and claims the benefit of priority from Japanese Patent Application No. 2016-008265 filed on Jan. 19, 2016. The entire disclosures of all of the above applications are incorporated herein by reference.

TECHNICAL FIELD

The present disclosure relates to a head-up display apparatus (hereinafter, referred to as a HUD apparatus for short) configured to be mounted to a mobile object and to display a virtual image visible to an occupant.

BACKGROUND ART

An existing HUD apparatus is mounted to a mobile object and displays a virtual image visible to an occupant. A HUD apparatus disclosed in Patent Literature 1 includes a laser projection portion, a scan portion, a screen member, and a refraction element portion. The laser projection portion projects multiple laser light fluxes having different wavelengths and superimposed one on another. The scan portion scans the laser light fluxes from the laser projection portion. The screen member is a member on which an image is drawn upon incidence of the laser light fluxes scanned by the scan portion. The refraction element portion having positive refractive power is located on a light path between the scan portion and the screen member and adjusts an incident angle of the laser light fluxes to the screen member by refraction. To be more specifically, the refraction element portion is formed of a single lens.

PRIOR TECHNICAL LITERATURE

Patent Literature

Patent Literature 1: JP-A-2010-145924

According to the configuration of Patent Literature 1, an image is drawn on the screen member by laser light fluxes having different wavelengths and superimposed one on another. However, when laser light fluxes scanned by the scan portion pass through each point of the single lens, the laser light fluxes split into respective colors due to a dispersing quality of a medium forming the lens, which may possibly give rise to a chromatic aberration in an image drawn on the screen member. A concern is raised that the chromatic aberration has an adverse effect on visibility of a virtual image formed by projecting such an image onto a projection member.

SUMMARY OF INVENTION

In view of the foregoing problems, it is an object of the present disclosure to provide a HUD apparatus forming a virtual image with high visibility.

According to one aspect of the present disclosure, a head-up display apparatus is configured to be mounted to a mobile object and to display a virtual image visible to an occupant by projecting an image onto a projection member. The head-up display apparatus comprises a laser projection portion configured to project a plurality of laser light fluxes having different wavelengths and superimposed one on another. The head-up display apparatus further comprises a scan portion configured to scan the laser light fluxes from the laser projection portion. The head-up display apparatus further comprises a screen member configured to be drawn with the image thereon upon incidence of the laser light fluxes scanned by the scan portion. The head-up display apparatus further comprises a refraction element portion having positive refractive power as a whole and located on a light path between the scan portion and the screen member to adjust an incident angle of the laser light fluxes to the screen member by refraction. The refraction element portion includes a positive lens part having positive refractive power. The refraction element portion further includes a negative lens part made of a medium with a higher dispersing quality than a medium forming the positive lens part and having negative refractive power.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Hereinafter, one embodiment of the present disclosure will be described according to the drawings.

Figure 1:
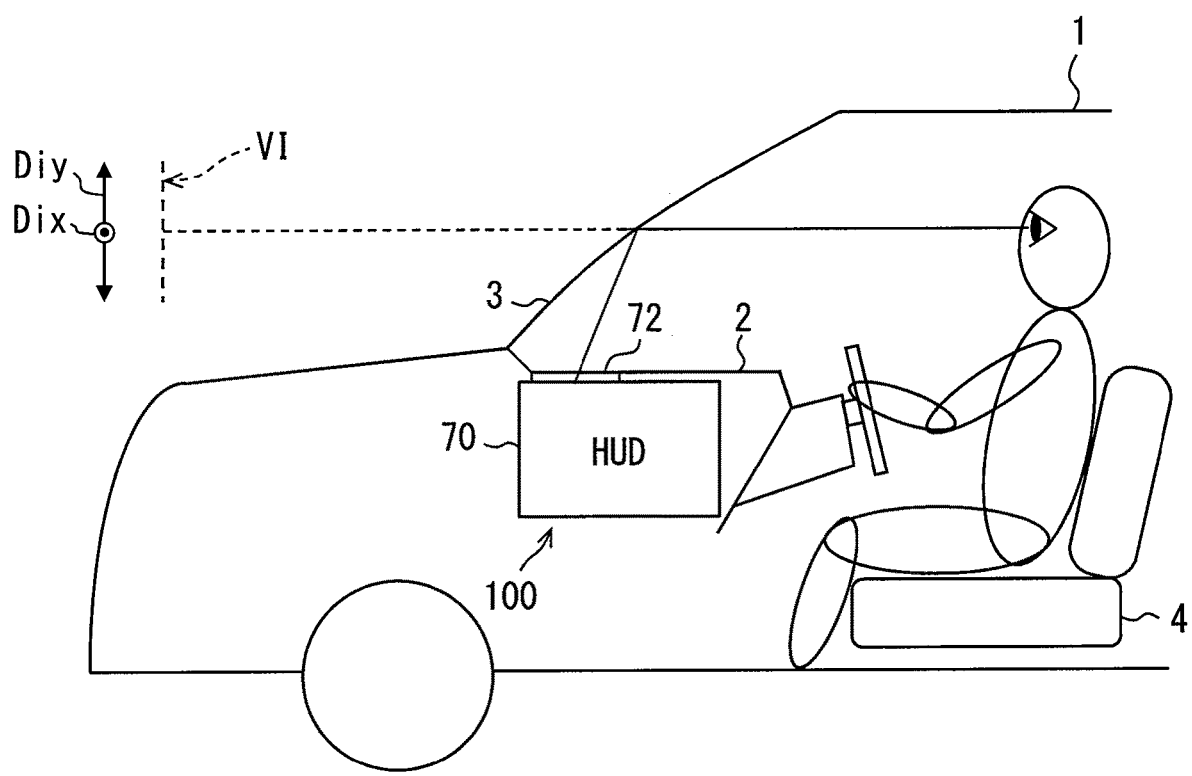
FIG. 1 is a schematic view showing a HUD apparatus according to one embodiment mounted to a vehicle.

A HUD apparatus 100 according to one embodiment of the present disclosure shown in FIG. 1 is mounted to an instrument panel 2 of a vehicle 1, which is one type of mobile object. The HUD apparatus 100 projects an image IM onto a windshield 3 of the vehicle 1 used as a projection member. The HUD apparatus 100 thus displays a virtual image VI visible to an occupant seated on a seat 4 of interest in the vehicle 1. That is, light of the image IM reflected on the windshield 3 reaches eyes of the occupant in a compartment of the vehicle 1, and the occupant senses the light. The occupant thus becomes able to recognize various types of information displayed as a virtual image VI. Examples of various types of information displayed as a virtual image VI include but not limited to a vehicle state value, such as a vehicle speed and a remaining amount of fuel, and vehicle information, such as road information and view supplemental information.

Figure 2:
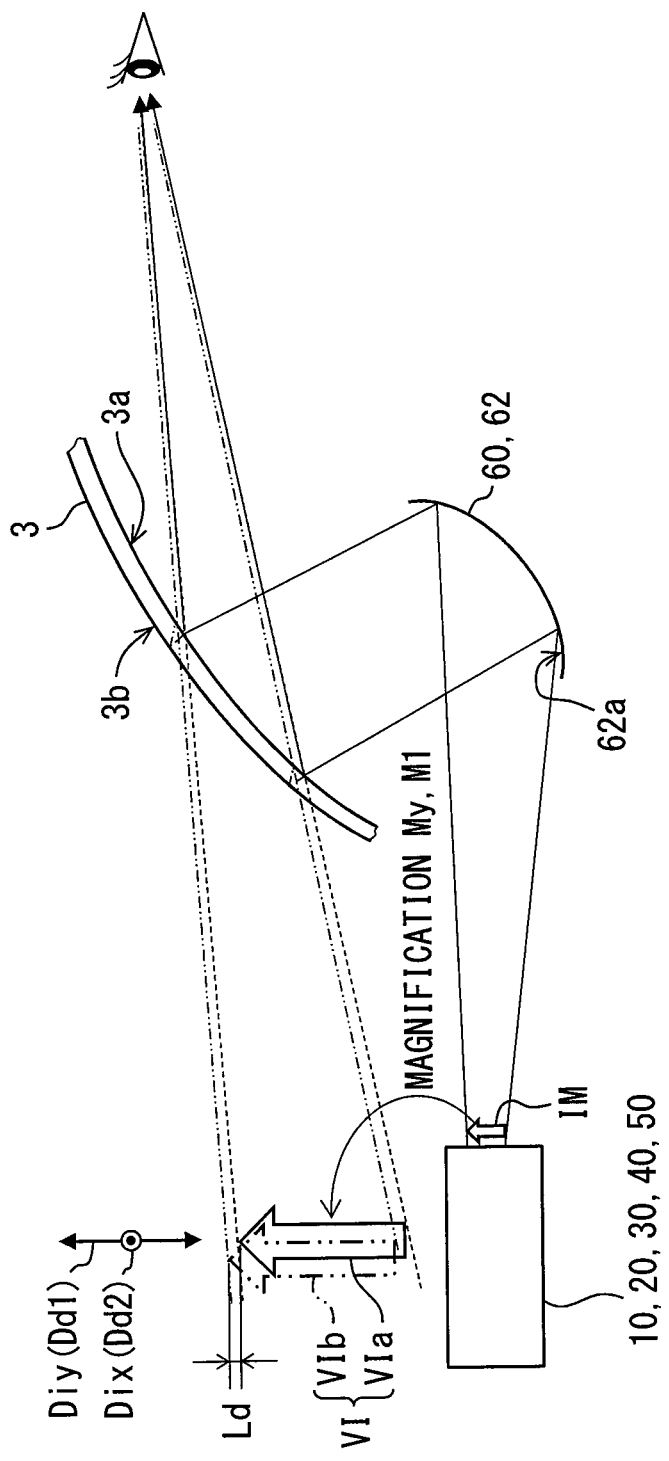
FIG. 2 is a view schematically showing a configuration of the HUD apparatus of the embodiment.

The windshield 3 of the vehicle 1 is located on a vehicle upper side at a higher position than the instrument panel 2 and formed of a light-transmitting plate made of glass, synthetic resin, or the like. The windshield 3 is located to tilt backward more on the vehicle upper side. In particular, as is shown in FIG. 2, a front surface 3a of the windshield 3 inside the compartment and facing the occupant is a smooth inwardly-curved or flat surface. A back surface 3b of the windshield 3 outside the compartment and facing opposite to the occupant is a smooth outwardly-curved or flat surface. An interval between the front surface 3a and the back surface 3b increases from the vehicle lower side to the vehicle upper side, which provides the windshield 3 with a portion of a wedge shape in cross section.

In the present embodiment, the vehicle lower side represents a gravity acting direction of a vehicle traveling or at rest on a level ground. The vehicle upper side represents an opposite direction to the direction represented by the vehicle lower side. A vehicle top-bottom direction represents directions represented by the vehicle upper side and the vehicle lower side.

When an image IM is displayed as a virtual image VI, a direction of the image IM along the vehicle top-bottom direction is given as an image top-bottom direction Diy, and a direction of the image IM perpendicular to the vehicle top-bottom direction is given as an image right-left direction Dix.

As are shown in FIGS. 1 and 2, the HUD apparatus 100 as above includes a laser projection portion 10, a scan portion 20, a refraction element portion 30, a reflection element portion 40, a screen member 50, and a light guide portion 60, all of which are installed inside a housing 70.

Figure 3:
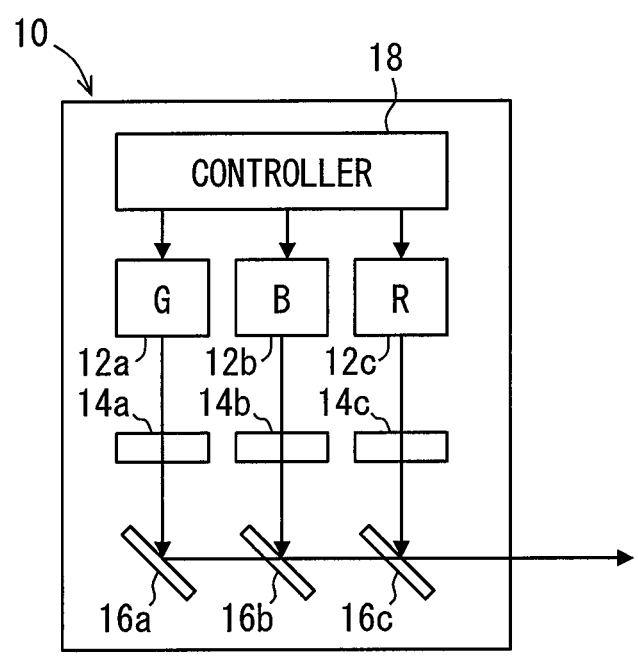
FIG. 3 is a schematic view showing a laser projection portion of the embodiment.

As is shown in FIG. 3 in detail, the laser projection portion 10 has multiple laser oscillators 12a, 12b, and 12c, multiple collimator lenses 14a, 14b, and 14c, and multiple dichroic mirrors 16a, 16b, and 16c. In the present embodiment, three laser oscillators 12a through 12c, three collimator lenses 14a through 14c, and three dichroic mirrors 16a through 16c are provided.

The three laser oscillators 12a through 12c oscillate laser light fluxes having different wavelengths. More specifically, the laser oscillator 12a oscillates a green laser light flux having a peak wavelength ranging, for example, from 490 to 530 nm, preferably a peak wavelength of 515 nm. The laser oscillator 12b oscillates a blue laser light flux having a peak wavelength ranging, for example, from 430 to 470 nm, preferably a peak wavelength of 450 nm. The laser oscillator 12c oscillates a red laser light flux having a peak wavelength ranging, for example, from 600 to 650 nm, preferably a peak wavelength of 640 nm. Laser light fluxes oscillated from the laser oscillators 12a through 12c go incident on the collimator lenses 14a through 14c, respectively.

The three collimator lenses 14a through 14c are spaced, respectively, from the laser oscillators 12a through 12c by a predetermined interval in travel directions of the respective laser light fluxes. The collimator lenses 14a through 14c collimate laser light fluxes of the corresponding colors by refracting the laser light fluxes.

The three dichroic mirrors 16a through 16c are spaced, respectively, from the collimator lenses 14a through 14c by a predetermined interval in travel directions of the respective laser light fluxes. The dichroic mirrors 16a through 16c reflect only laser light fluxes having particular wavelengths which have passed through the corresponding collimator lenses 14a through 14c and transmit the laser light fluxes having the other wavelengths. More specifically, the dichroic mirror 16a corresponding to the collimator lens 14a reflects a green laser light flux. The dichroic mirror 16b corresponding to the collimator lens 14b reflects a blue laser light flux and transmits a green laser light flux. The dichroic mirror 16c corresponding to the collimator lens 14c reflects a red laser light flux and transmits green and red laser light fluxes.

The dichroic mirror 16b is spaced from the dichroic mirror 16a by a predetermined interval in a travel direction of a green laser light flux reflected on the dichroic mirror 16a. The dichroic mirror 16c is spaced from the dichroic mirror 16b by a predetermined interval in a travel direction of a blue laser light flux reflected on the dichroic mirror 16b. Owing to locations as above, a green laser light flux reflected on the dichroic mirror 16a passes through the dichroic mirror 16b and is superimposed on a blue laser light flux reflected on the dichroic mirror 16b. Also, the green laser light flux and the blue laser light flux pass through the dichroic mirror 16c and are superimposed on a red laser light flux reflected on the dichroic mirror 16c.

The respective laser oscillators 12a through 12c are electrically connected to a controller 18. The laser oscillators 12a through 12c oscillate laser light fluxes according to an electrical signal from the controller 18. Various colors can be reproduced by additive color mixing of laser light fluxes of three colors oscillated from the respective oscillators 12a through 12c. The laser projection portion 10 thus projects multiple laser light fluxes having different wavelengths and superimposed one on another toward the scan portion 20.

Figure 4:
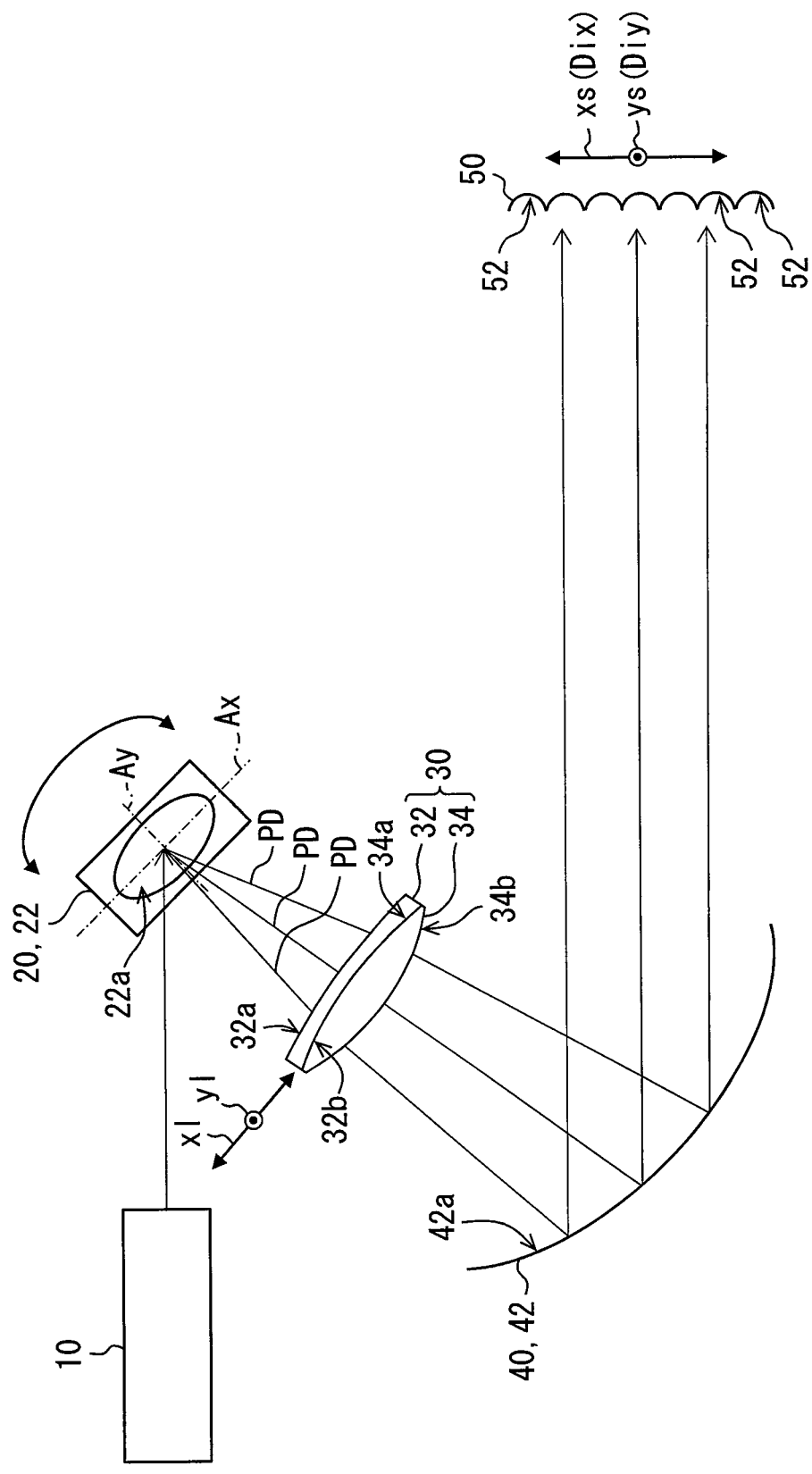
FIG. 4 is a schematic view showing an optical system from the laser projection portion to a screen member of the embodiment.

As is shown in FIG. 4 in detail, the scan portion 20 has a scan mirror 22. The scan mirror 22 is a MEMS mirror using MEMS (micro-electro-mechanical systems) scanning laser light fluxes from the laser projection portion 10 by temporally changing projection directions PD of the laser light fluxes. The scan mirror 22 is provided with a reflection surface 22c formed by applying metal vapor deposition of aluminum or the like on a surface facing the dichroic mirror 16c at a predetermined interval. The reflection surface 22c is configured to swing about two rotation axes Ax and Ay orthogonal to each other along the reflection surface 22c.

The scan mirror 22 is electrically connected to the controller 18 and configured to change orientations of the reflection surface 22c according to a scan signal. The scan portion 20 is thus configured to scan laser light fluxes in association with the laser projection portion 10 by using the scan mirror 22 controlled by the controller 18. Laser light fluxes scanned by the scan portion 20 go incident on the refraction element portion 30.

The refraction element portion 30 is located on a light path between the scan portion 20 and the screen member 50, in particular, between the scan portion 20 and the reflection element portion 40 in the present embodiment. The refraction element portion 30 has positive refractive power as a whole and adjusts an incident angle of laser light fluxes to the screen member 50 by refraction.

The refraction element portion 30 has a negative lens part 32 having negative refractive power, and a positive lens part 34 having positive refractive power. In the present embodiment, in particular, the refraction element portion 30 is formed by integrally bonding the negative lens part 32 and the positive lens part 34 together. The negative lens part 32 is located closer to the scan portion 20 than the positive lens part 34 while the positive lens part 34 is located closer to the screen member 50 than the negative lens part 32.

The negative lens part 32 is made of a medium, such as glass, and therefore has a light-transmitting property. The medium forming the negative lens part 32 has, for example, a refractive index nd=1.92 and an Abbe's number vd=31, and has a higher refractive index and a higher dispersing quality than a medium forming the positive lens part 34.

The negative lens part 32 has multiple refraction surfaces 32a and 32b at which laser light fluxes refract. More specifically, the incoming-side refraction surface 32a is a convex spherical surface. The exiting-side refraction surface 32b is a concave spherical surface and shared with an incoming-side refraction surface 34a of the positive lens part 34 when bonded to the positive lens part 34. A radius of curvature of the incoming-side refraction surface 32a is set to be larger than a radius of curvature of the exiting-side refraction surface 32b. Hence, the negative lens part 32 forms a concave lens of a meniscus shape.

The positive lens part 34 is made of a medium, such as glass, and therefore has a light-transmitting property. The medium forming the positive lens part 34 has, for example, a refractive index nd=1.44 and an Abbe's number vd=95, and has a lower refractive index and a lower dispersing quality than the medium forming the negative lens part 32.

The positive lens part 34 has multiple refraction surfaces 34a and 34b at which laser light fluxes refract. More specifically, the incoming-side refraction surface 34b is a convex spherical surface and shared with the exiting-side refraction surface 32b of the negative lens part 32 when bonded to the negative lens part 32 as described above. The exiting-side refraction surface 34b is a convex aspherical surface, in particular, a freeform surface in the present embodiment. Hence, the positive lens part 34 forms a biconvex lens.

After laser light fluxes refract at and pass through the refraction element portion 30 configured as above, the laser light fluxes go incident on the reflection element portion 40.

The reflection element portion 40 is located on a light path between the scan portion 20 and the screen member 50, in particular, between the refraction element portion 30 and the screen member 50 in the present embodiment. The reflection element portion 40 has a freeform mirror 42.

The freeform mirror 42 is formed by providing a reflection surface 42a on a surface of a base material made of synthetic resin, glass, or the like by means of vapor deposition of aluminum or the like. The reflection surface 42a is a concave freeform surface curved inward at a center. The freeform mirror 42 of the reflection element portion 40 adjusts an incident angle of laser light fluxes from the refraction element 30 to the screen member 50 in cooperation with the refraction element portion 30 by reflecting the laser light fluxes toward the screen member 50. To be more exact, the freeform mirror 42 adjusts indecent angles of laser light fluxes to the screen member 50 to minimize a difference of the incident angles among laser light fluxes in respective projection directions PD.

The screen member 50 is a reflective screen formed by vapor depositing aluminum on a surface of a base material made of synthetic resin, glass, or the like. The screen member 50 is formed as a micromirror array made up of multiple micro-reflection surfaces 52 arrayed within a projection region PA where laser light fluxes are projected. In the present embodiment, in particular, each reflection surface 52 is of a concave shape having a sufficiently smaller radius of curvature than the respective surfaces 32a, 32b, 34a, 34b, and 42a of the refraction element portion 30 and the reflection element portion 40. However, the reflection surfaces 52 may be of a convex shape.

Figure 5:
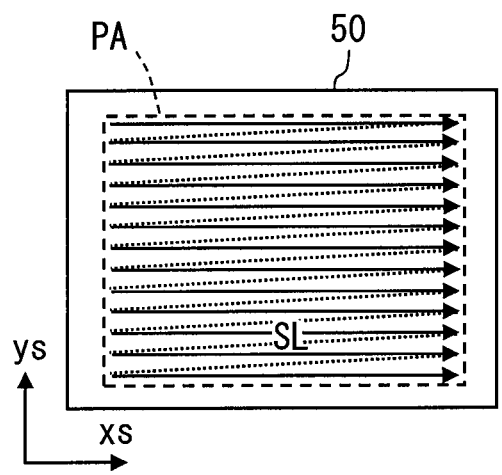
FIG. 5 is a top view used to describe how an image is drawn on the screen member.

As is shown in FIG. 5, an image IM is drawn on the screen member 50 upon incidence of laser light fluxes scanned by the scan portion 20. More specifically, the scan portion 20 projects laser light fluxes toward the projection region PA of the screen member 50 by temporally changing the projection directions PD of the laser light fluxes. Laser light fluxes are successively scanned along multiple scan lines SL under control of the controller 18. Consequently, an image IM is drawn by pulse-irradiating laser light fluxes intermittently while incident positions of the laser light fluxes are moving in the projection region PA. The image IM thus drawn in the projection region PA is drawn in 60 frames per second, for example, as an image having 480 pixels in a direction xs along the scan lines SL and 240 pixels in a direction ys perpendicular to the scan lines SL. In FIG. 5, the respective reflection surfaces 52 are not shown.

Laser light fluxes as light of the image IM and forming respective pixels are reflected on the respective reflection surfaces 62a of the screen member 50 and therefore go incident on the light guide portion 60 while being dispersed.

As is shown in FIG. 2, the light guide portion 60 has a concave mirror 62. The concave mirror 62 is formed by providing a reflection surface 62a on a surface of a base material made of synthetic resin, glass, or the like by means of vapor deposition of aluminum. The reflection surface 62a forms a smooth curved surface of a concave shape inwardly curved at a center. The concave mirror 62 reflects light of the image IM from the screen member 50 toward the windshield 3.

A light-transmitting dustproof cover 72 is provided to an opening made on the vehicle upper side of the housing 70. Light of the image IM reflected on the concave mirror 62 passes through the dustproof cover 72 from the vehicle lower side and goes incident on the windshield 3 on the vehicle upper side. The light guide portion 60 thus magnifies and guides the image IM drawn on the screen member 50 to the windshield 3. A planar mirror or the like may be added to the light guide portion 60.

As is shown in FIG. 2, while most of light of the image IM is reflected on the front surface 3a of the windshield 3 toward the occupant, light may possibly enter the medium forming the windshield 3. A part of such light is reflected on the back surface 3b and emitted toward the occupant from the front surface 3a. Hence, a virtual image VI visible to the occupant may be a slightly displaced double image of a virtual image VIa formed by reflection on the front surface 3a and a virtual image VIb formed by reflection on the back surface 3b. Even when the windshield 3 is of, for example, a wedge shape in cross section as described above, it may be difficult to perfectly match positions of the two virtual images VIa and VIb in the entire virtual image VI.

A direction in which the virtual image VIb formed by reflection on the back surface 3b is displaced from the virtual image VIa formed by reflection on the front surface 3a is given as a displacement parallel direction Dd1, and a direction perpendicular to the displacement parallel direction Dd1 is given as a displacement perpendicular direction Dd2. In the present embodiment in which light of an image IM goes incident on the windshield 3 along the vehicle top-bottom direction, the displacement parallel direction Dd1 substantially coincides with the image top-bottom direction Diy and the displacement perpendicular direction Dd2 substantially coincides with the image right-left direction Dix.

In the present embodiment, a virtual image VI visible to the occupant is magnified by the light guide portion 60 and the windshield 3 with respect to an image IM drawn on the screen member 50. Let My be a magnification in the image top-bottom direction Diy of a magnification of the virtual image VI, and let M1 be a magnification in the displacement parallel direction Dd1.

In a virtual image VI formed by light of an image IM emitted from the screen member 50 and reflected on the light guide portion 60 and the windshield 3, rows of pixels in the direction xs on the screen member 50 are aligned side by side along the image right-left direction Dix and rows of pixels in the direction ys are aligned side by side along the image top-bottom direction Diy. That is, the direction xs forming the image right-left direction Dix is a direction corresponding to the displacement perpendicular direction Dd2 while the direction ys forming the image top-bottom direction Diy is a direction corresponding to the displacement parallel direction Dd1 (see also FIGS. 4 and 5). A moving direction of laser light fluxes scanned in the direction xs is given as a direction xl and a moving direction of laser light fluxes scanned in the direction ys is given as a direction yl as directions corresponding, respectively, to the direction xs and the direction ys on the respective refraction surfaces 32a, 32b, 34a, and 34b of the refraction element portion 30 (see also FIG. 4).

In the refraction element portion 30 shown in FIG. 4, let f1 be a focal length of the negative lens part 32 and let v1 be an Abbe's number of the negative lens part 32. Also, let f2x be a focal length of the positive lens part 34 in the direction xl, let f2y be a focal length of the positive lens part 34 in the direction yl, and let v2 be an Abbe's number of the positive lens part 34. Then, in the present embodiment, the refraction element portion 30 is designed to establish Inequality (1) as follows:

$$1/f1 \cdot v1 + 1/f2x \cdot v2 < 1/f1 \cdot v1 + 1/f2y \cdot v2 \qquad (1).$$

Inequality (1) above can be rewritten simply as: f2y<f2x. Hence, a focal length of the positive lens part 34 in the direction xl corresponding to the image right-left direction Dix is longer than a focal length of the positive lens part 34 in the direction yl corresponding to the image top-bottom direction Diy.

To be more specific, a radius of curvature in the direction xl corresponding to the image right-left direction Dix is larger than a radius of curvature in the direction yl corresponding to the image top-bottom direction Diy at any point including an optical axis on the exiting-side refraction surface 34b of the positive lens part 34.

The other negative lens part 32 is of a rotationally symmetric shape. Hence, a focal length of the entire refraction element portion 30 in the direction xl corresponding to the image right-left direction Dix is longer than a focal length in the direction yl corresponding to the image top-bottom direction Diy.

Figure 6:
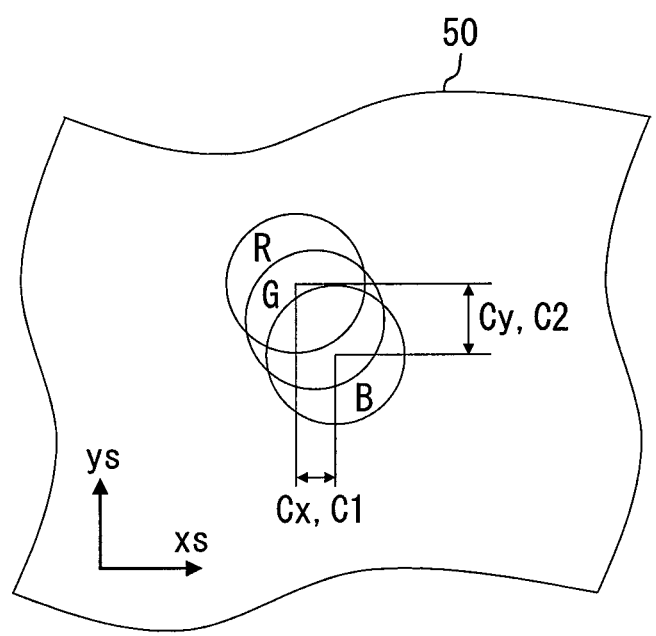
FIG. 6 is an enlarged view showing laser light fluxes forming one pixel of FIG. 5 and used to describe chromatic aberrations.

The following will describe an image IM drawn on the screen member 50 by laser light fluxes which refract at and pass through the refraction element portion 30 designed as above. As has been described above, laser light fluxes scanned by the scan portion 20 in one projection direction PD form every one pixel in an image IM. As is schematically shown in FIG. 6, when laser light fluxes of respective colors having different wavelengths in one projection direction PD are superimposed one on another to form one pixel, incident positions on the screen member 50 may be displaced and a chromatic aberration may possibly occur.

A chromatic aberration Cx in the image right-left direction Dix among laser light fluxes in each projection direction PD is made smaller than a chromatic aberration Cy in the image top-bottom direction Diy by the refraction element portion 30 designed in accordance with Inequality (1) above.

Light paths of laser light fluxes vary with the projection directions PD. Hence, the chromatic aberrations Cx and Cy occur differently for each pixel of the image IM. However, the relationship of the chromatic aberrations Cx and Cy as above may be established for all the pixels. It should be noted, however, that the relationship of the chromatic aberrations Cx and Cy may not be established at a paraxial point of the refraction element portion 30 (for example, a pixel at a center of the image IM) because the chromatic aberrations Cx and Cy do not occur at all or occur only negligibly among laser light fluxes passing through the paraxial point.

For example, by designing a shape of the exiting-side refraction surface 34b of the positive lens part 34 as needed, the chromatic aberration Cy in the image top-bottom direction Diy among laser light fluxes in each projection direction PD can be smaller than a value found by dividing a component in the image top-bottom direction Diy of a displacement amount Ld between the virtual images VIa and VIb by the magnification My. It is also considered that the upper limit of the chromatic aberration Cy in the image top-bottom direction Diy as above may apply to all the pixels.

The relationship of the chromatic aberrations Cx and Cy in the present embodiment described as above is also established by substituting the displacement parallel direction Dd1 for the image top-bottom direction Diy and the displacement perpendicular direction Dd2 for the image right-left direction Dix. That is, a chromatic aberration C2 in a direction corresponding to the displacement perpendicular direction Dd2 among laser light fluxes of an image IM drawn on the screen member 50 may be substituted for the chromatic aberration Cx and a chromatic aberration C1 in a direction corresponding to the displacement parallel direction Dd1 may be substituted for the chromatic aberration Cy. Further, a relationship of the chromatic aberration Cy and the magnification My may be substituted by a relationship of the chromatic aberration C1 and the magnification M1.

Functions and Effects

Functions and effects of the present embodiment described above will be described in the following.

According to the present embodiment, laser light fluxes having different wavelengths and superimposed one on another refract at the refraction element portion 30. When the laser light fluxes refract at the positive lens part 34, the laser light fluxes undergo a splitting action and split according to wavelengths. On the contrary, when the laser light fluxes refract at the negative lens part 32, the laser light fluxes undergo a canceling action which cancels out the splitting action. The negative lens part 32 is made of a medium with a higher dispersing quality than the medium forming the positive lens part 34. Hence, even when the refraction element portion 30 has positive refractive power as a whole, the splitting action and the canceling action can be well balanced. Accordingly, even when laser light fluxes are scanned by the scan portion 20, an incident angle of the laser light fluxes to the screen member 50 can be adjusted by the refraction element portion 30 while keeping the laser light fluxes superimposed one on another. Because the chromatic aberrations Cx and Cy (C1 and C2) of an image IM drawn on the screen member 50 are restricted, visibility of a virtual image VI made visible by projecting the image IM on the windshield 3 can be enhanced.

In a case where an image IM is projected onto the windshield 3 formed of a light-transmitting plate having the front surface 3a facing the occupant and the back surface 3b facing opposite to the front surface 3a, a virtual image VIb formed by reflection on the back surface 3b may possibly be displayed at a position displaced from a virtual image VIa formed by reflection on the front surface 3a. Hence, even when the chromatic aberration C1 in the displacement parallel direction Dd1 is removed preferentially by the refraction element portion 30, displacement between the virtual images VIa and VIb makes the visibility improving effect small. Such being the case, the chromatic aberration C2 in a direction corresponding to the displacement perpendicular direction Dd2 among laser light fluxes forming an image IM drawn on the screen member 50 is made smaller than the chromatic aberration C1 in a direction corresponding to the displacement parallel direction Dd1 in the present embodiment. That is, the visibility improving effect by the refraction element portion 30 can be enhanced by preferentially removing the chromatic aberration C2 in the displacement perpendicular direction Dd2 while allowing a certain degree of the chromatic aberration C1 in the displacement parallel direction Dd1.

According to the present embodiment, the chromatic aberration C1 in a direction corresponding to the displacement parallel direction Dd1 among laser light fluxes forming an image IM drawn on the screen member 50 is smaller than a value found by dividing a displacement amount Ld between the virtual images VIa and VIb formed by reflections on the front surface 3a and the back surface 3b, respectively, by the magnification M1. The chromatic aberration C1 virtually displayed under influence of magnification by the light guide portion 60 and the windshield 3 becomes smaller than the displacement amount Ld. Hence, an inconvenience that the chromatic aberration C1 in the displacement parallel direction Dd1 deteriorates visibility can be restricted also when the chromatic aberration C2 in the displacement perpendicular direction Dd2 is removed preferentially.

An image IM is projected onto the windshield 3 located on the vehicle upper side from the HUD apparatus 100 mounted to the instrument panel 2. In a case where an image IM is projected onto the windshield 3 formed of a light-transmitting plate having the front surface 3a facing the occupant and the back surface 3b facing opposite to the front surface 3a, a virtual image VIb formed by reflection on the back surface 3b is often displayed at a position displaced in the image top-bottom direction Diy from a virtual image VIa formed by reflection on the front surface 3a. Hence, even when the chromatic aberration Cy in the image top-bottom direction Diy is removed preferentially by the refraction element portion 30, displacement between the virtual images VIa and VIb makes the visibility improving effect small. Such being the case, the chromatic aberration Cx in the image right-left direction Dix among laser light fluxes forming an image IM drawn on the screen member 50 is made smaller than the chromatic aberration Cy in the image top-bottom direction Diy in the present embodiment. That is, the visibility improving effect by the refraction element portion 30 can be enhanced by preferentially removing the chromatic aberration Cx in the image right-left direction Dix while allowing a certain degree of the chromatic aberration Cy in the image top-bottom direction Diy.

According to the present embodiment, a focal length of the refraction element portion 30 in the direction xl corresponding to the image right-left direction Dix is longer than a focal length of the refraction element portion 30 in the direction yl corresponding to the image top-bottom direction Diy. Given the foregoing conditions, for example, Inequality (1) above is established, in which case the chromatic aberration Cx can be removed preferentially.

According to the present embodiment, the chromatic aberration Cy in the image top-bottom direction Diy among laser light fluxes forming an image IM drawn on the screen member 50 is smaller than a value found by dividing a component in the image top-bottom direction Diy of a displacement amount Ld between the virtual images VIa and VIb formed by reflections on the front surface 3a and the back surface 3b, respectively, by the magnification My. The chromatic aberration Cy virtually displayed under influence of magnification by the light guide portion 60 and the windshield 3 becomes smaller than the component in the image top-bottom direction Diy of the displacement amount Ld. Hence, an inconvenience that the chromatic aberration Cy in the image top-bottom direction Diy deteriorates visibility can be restricted also when the chromatic aberration Cx in the image right-left direction Dix is removed preferentially.

According to the present embodiment, the refraction element portion 30 has the multiple refraction surfaces 32a, 32b, 34a, and 34b, and the refraction surface 34b located closest to the screen member 50 is an aspherical surface. The refraction surface 34b located closest to the screen member 50 can transmit more laser light fluxes scanned by the scan portion 20 on an outer peripheral side. Hence, an aberration correction effect by the aspherical surface can be obtained in a reliable manner.

According to the present embodiment, the reflection element portion 40 reflecting laser light fluxes is located on a light path between the scan portion 20 and the screen member 50. A chromatic aberration is not increased when the reflection element portion 40 is additionally provided. Hence, a quality of an image IM can be upgraded while restricting the chromatic aberrations Cx and Cy (C1 and C2).

According to the present embodiment, the refraction element portion 30 is located between the scan portion 20 and the reflection element portion 40. Hence, laser light fluxes scanned by the scan portion 20 pass through the refraction element portion 30 before the laser light fluxes disperse sufficiently. The refraction element portion 30 can be thus made compact.

Other Embodiments

While the above has described one embodiment of the present disclosure, an interpretation of the present disclosure is not limited to the embodiment above and the present disclosure can be implemented in various other embodiments or a combination of the various embodiments within the scope of the present disclosure.

More specifically, in a first modification, the reflection element portion 40 may be located on a light path between the scan portion 20 and the refraction element portion 30.

In a second modification, the refraction element portion 30 alone may be located on a light path between the scan portion 20 and the screen member 50 by omitting the reflection element portion 40.

In a third modification, the negative lens part 32 and the positive lens part 34 are not necessarily bonded to each other and formed separately. To be more specific, a clearance may be provided between the exiting-side refraction surface 32b of the negative lens part 32 and the incoming-side refraction surface 34a of the positive lens part 34 or the negative lens part 32 and the positive lens part 34 may be slightly spaced apart from each other.

In a fourth modification, the positive lens part 34 may be located closer to the scan portion 20 than the negative lens part 32 in the refraction element portion 30.

In a fifth modification, a combination of surface shapes of the respective refraction surfaces 32a, 32b, 34a, and 34b of the refraction element portion 30 is not limited to a case where the refraction surfaces 32a, 32b, and 34a are spherical surfaces and the refraction surface 34b is a freeform surface, and various combinations among a spherical surface, a rotationally symmetric aspherical surface, a cylindrical surface, a freeform surface, and so on can be also adopted.

In a sixth modification, the displacement parallel direction Dd1 and the image top-bottom direction Diy may not necessarily coincide with each other. The displacement perpendicular direction Dd2 and the image right-left direction Dix may not necessarily coincide with each other, either.

In a seventh modification, a focal length of the refraction element portion 30 in a direction corresponding to the displacement perpendicular direction Dd2 may not be longer than a focal length of the refraction element portion 30 in a direction corresponding to the displacement parallel direction Dd1. A focal length of the refraction element portion 30 in a direction corresponding to the image right-left direction Dix may not be longer than a focal length of the refraction element portion 30 in a direction corresponding to the image top-bottom direction, either.

In an eighth modification, the chromatic aberration Cy in a direction corresponding to the displacement parallel direction Dd1 among laser light fluxes forming an image IM drawn on the screen member 50 may not be smaller than a value found by dividing a displacement amount Ld between the virtual images VIa and VIb formed by reflections on the front surface 3a and the back surface 3b, respectively, by the magnification My in the displacement parallel direction. As an example, the chromatic aberration Cy may be smaller than the quotient only in a partial region, such as an upper (or lower) half of an image IM.

In a ninth modification, the projection member may have a constant interval between the front surface 3a and the back surface 3b.

In a tenth modification, the projection member may be a combiner provided separately from the windshield 3.

In an eleventh modification, the projection member may hardly have displacement between the virtual images VIa and VIb formed by reflections on the front surface 3a and the back surface 3b, respectively, or may not form the virtual image VIb by reflection on the back surface 3b.

In a twelfth modification, the present disclosure may be applied to various types of mobile object (transport devices) other than the vehicle 1, such as a ship and an air plane.

As has been described, the present disclosure relates to a head-up display apparatus mounted to the mobile object 1 and displaying a virtual image VI (VIa and VIb) visible to an occupant by projecting an image IM onto the projection member 3. The head-up display apparatus has the laser projection portion 10, the scan portion 20, the screen member 50, and the refraction element portion 30. The laser projection portion 10 projects multiple laser light fluxes having different wavelengths and superimposed one on another. The scan portion 20 scans the laser light fluxes from the laser projection portion. The image is drawn on the screen member 50 upon incidence of the laser light fluxes scanned by the scan portion. The refraction element portion 30 having positive refractive power as a whole is located on a light path between the scan portion and the screen member and adjusts an incident angle of the laser light fluxes to the screen member by refraction. The refraction element portion has the positive lens part 34 having positive refractive power, and the negative lens part 32 made of a medium with a higher dispersing quality than a medium forming the positive lens part and having negative refractive power.

According to the disclosure as above, laser light fluxes having different wavelengths and superimposed one on another refract at the refraction element portion. When the laser light fluxes refract at the positive lens part, the laser light fluxes undergo a splitting action and split according to wavelengths. On the contrary, when the laser light fluxes refract at the negative lens part, the laser light fluxes undergo a canceling action which cancels out the splitting action. The negative lens part is made of a medium with a higher dispersing quality than the medium forming the positive lens part. Hence, even when the refraction element portion has positive refractive power as a whole, the splitting action and the canceling action can be well balanced. Accordingly, even when laser light fluxes are scanned by the scan portion, an incident angle of the laser light fluxes to the screen member can be adjusted by the refraction element portion while keeping the laser light fluxes superimposed one on another. Because a chromatic aberration of the image drawn on the screen member is restricted, visibility of the virtual image made visible by projecting the image on the projection member can be enhanced.

While the present disclosure has been described according to the embodiment above, it should be understood that the present disclosure is not limited to the embodiment above and structure thereof. The present disclosure includes various modifications and alterations within the equivalent scope. In addition, various combinations and embodiments, as well as other combinations further including one element alone and more or less than one element are also within the scope and the idea of the present disclosure.

What is claimed is:

1. A head-up display apparatus configured to be mounted to a mobile object and to display a virtual image visible to an occupant by projecting an image onto a projection member, the head-up display apparatus comprising:
   a laser projection portion configured to project a plurality of laser light fluxes having different wavelengths and superimposed one on another;
   a scan portion configured to scan the laser light fluxes from the laser projection portion;
   a screen member configured to be drawn with the image thereon upon incidence of the laser light fluxes scanned by the scan portion; and
   a refraction element portion having positive refractive power as a whole and located on a light path between the scan portion and the screen member to adjust an incident angle of the laser light fluxes to the screen member by refraction, wherein
   the refraction element portion includes:
      a positive lens part having positive refractive power; and
      a negative lens part made of a medium with a higher dispersing quality than a medium forming the positive lens part and having negative refractive power,
   the projection member is formed of a light-transmitting plate having a front surface facing the occupant and a back surface facing opposite to the front surface, and
   a direction in which a virtual image formed by reflection on the back surface is displaced from a virtual image formed by reflection on the front surface is given as a displacement parallel direction, a direction perpendicular to the displacement parallel direction is given as a displacement perpendicular direction, the positive lens part has a first focal length corresponding to the displacement perpendicular direction and a second focal length corresponding to the displacement parallel direction, the first focal length is longer than the second focal length, and the first focal length being greater than the second focal length causes a chromatic aberration in a direction corresponding to the displacement perpendicular direction among the laser light fluxes forming the image to be drawn on the screen member to be smaller than a chromatic aberration in a direction corresponding to the displacement parallel direction.

2. The head-up display apparatus according to claim 1, further comprising:
a light guide portion configured to magnify the image, which is to be drawn on the screen member, and to guide the image to the projection member, wherein
let M1 be a magnification in the displacement parallel direction of a magnification of the virtual image with respect to the image to be drawn on the screen member when magnified by the light guide portion and the projection member, then the chromatic aberration in a direction corresponding to the displacement parallel direction among the laser light fluxes to form the image to be drawn on the screen member is smaller than a value found by dividing a displacement amount, which is between the virtual image to be formed by reflection on the front surface and the virtual image to be formed by the reflection on the back surface, by the magnification M1.

3. The head-up display apparatus according to claim 1, wherein
the refraction element portion has a plurality of refraction surfaces at which the laser light fluxes refract, and
one refraction surface located closest to the screen member among the plurality of refraction surfaces is an aspherical surface.

4. The head-up display apparatus according to claim 1, further comprising:
a reflection element portion located on a light path between the scan portion and the screen member and configured to reflect the laser light fluxes.

5. The head-up display apparatus according to claim 4, wherein
the refraction element portion is located on a light path between the scan portion and the reflection element portion.

6. A head-up display apparatus configured to be mounted to an instrument panel of a vehicle as a mobile object and to display a virtual image visible to an occupant by projecting an image onto a projection member, the head-up display apparatus comprising:
a laser projection portion configured to project a plurality of laser light fluxes having different wavelengths and superimposed one on another;
a scan portion configured to scan the laser light fluxes from the laser projection portion;
a screen member configured to be drawn with the image thereon upon incidence of the laser light fluxes scanned by the scan portion; and
a refraction element portion having positive refractive power as a whole and located on a light path between the scan portion and the screen member to adjust an incident angle of the laser light fluxes to the screen member by refraction, wherein
the refraction element portion includes:
a positive lens part having positive refractive power; and
a negative lens part made of a medium with a higher dispersing quality than a medium forming the positive lens part and having negative refractive power,
the projection member is located on an upper side of the vehicle at a higher position than the instrument panel and formed of a light-transmitting plate having a front surface facing the occupant and a back surface facing opposite to the front surface, and
a direction of the image along a top-bottom direction of the vehicle when the image is displayed as the virtual image is given as an image top-bottom direction, a direction of the image perpendicular to the image top-bottom direction is given as an image right-left direction, the positive lens part has a first focal length corresponding to the image right-left direction and a second focal length corresponding to the image top-bottom direction, and the first focal length is longer than the second focal length, and the first focal length being greater than the second focal length causes a chromatic aberration in the image right-left direction among the laser light fluxes to form the image to be drawn on the screen member to be smaller than a chromatic aberration in the image top-bottom direction.

7. The head-up display apparatus according to claim 6, further comprising:
a light guide portion configured to magnify the image to be drawn on the screen member and to guide the image to the projection member, wherein
let My be a magnification in the image top-bottom direction of a magnification of the virtual image with respect to the image to be drawn on the screen member when magnified by the light guide portion and the projection member, then the chromatic aberration in the image top-bottom direction among the laser light fluxes to form the image to be drawn on the screen member is smaller than a value found by dividing a component, which is in the image top-bottom direction of a displacement amount between a virtual image to be formed by reflection on the front surface and a virtual image to be formed by reflection on the back surface, by the magnification My.

* * * * *